(12) United States Patent
Tassy et al.

(10) Patent No.: US 12,319,198 B2
(45) Date of Patent: Jun. 3, 2025

(54) INTERIOR-LIGHTING DEVICE FOR A VEHICLE

(71) Applicant: VALEO VISION, Bobigny (FR)

(72) Inventors: Pierre-Louis Tassy, Bobigny (FR); Abdelghani Sbihi, Bobigny (FR); Hui Jin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/683,946

(22) PCT Filed: Aug. 2, 2022

(86) PCT No.: PCT/EP2022/071607
§ 371 (c)(1),
(2) Date: Feb. 15, 2024

(87) PCT Pub. No.: WO2023/030801
PCT Pub. Date: Mar. 9, 2023

(65) Prior Publication Data
US 2024/0343185 A1  Oct. 17, 2024

(30) Foreign Application Priority Data
Sep. 2, 2021  (FR) ..................................... 2109194

(51) Int. Cl.
*B60Q 3/217* (2017.01)
*B60Q 3/64* (2017.01)
*B60Q 3/78* (2017.01)

(52) U.S. Cl.
CPC .............. *B60Q 3/217* (2017.02); *B60Q 3/64* (2017.02); *B60Q 3/78* (2017.02)

(58) Field of Classification Search
CPC . B60Q 3/217; B60Q 3/64; B60Q 3/78; B60Q 3/20; B60Q 3/10; B60Q 3/233;
(Continued)

(56) References Cited

U.S. PATENT DOCUMENTS

2016/0195230 A1* 7/2016 Grosdidier ............ F21S 41/151
362/511
2017/0122519 A1   5/2017 Freiding et al.

FOREIGN PATENT DOCUMENTS

DE  10 2010 054 929 A1   6/2012
DE  10 2011 000 022 A1   7/2012
(Continued)

OTHER PUBLICATIONS

DE102010054929A1 machine translation; 6 pages. (Year: 2010).*
(Continued)

*Primary Examiner* — Laura K Tso
(74) *Attorney, Agent, or Firm* — Oblon, McClelland, Maier & Neustadt, L.L.P.

(57) ABSTRACT

An Interior-lighting device for a motor vehicle includes a carrier on which are placed a first row of light sources and a second row of light sources. The lighting device includes a first light guide that includes an evacuation face, light rays emitted by the first row of light sources being transmitted to the evacuation face. Also included is a second light guide that includes an entrance face, a first exit face and a second exit face, light rays emitted by the second row of light sources being transmitted to these first and second exit faces.

20 Claims, 2 Drawing Sheets

Figure 1:
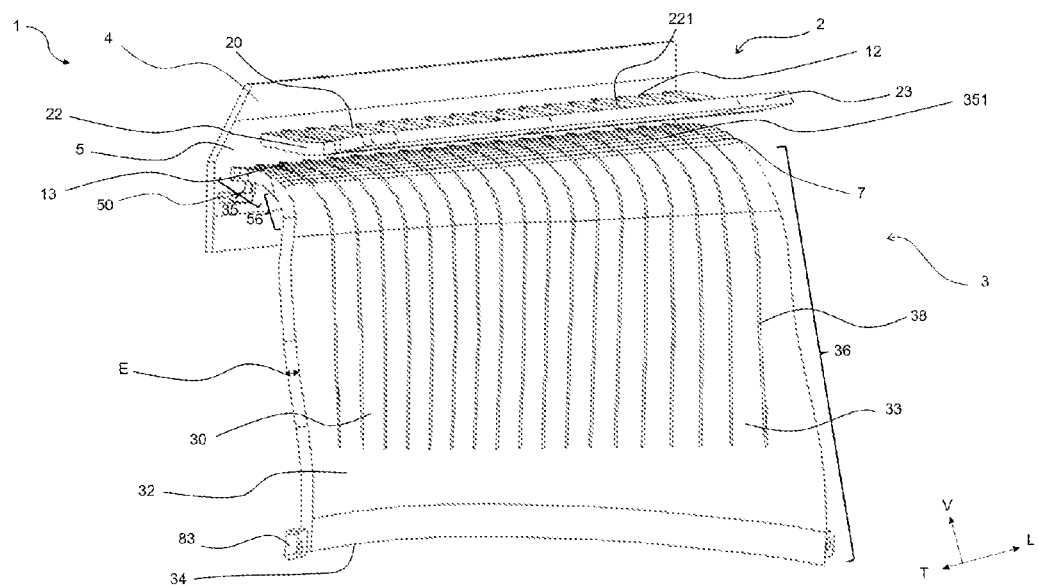

(58) Field of Classification Search
CPC .......... B60Q 3/30; B60Q 3/208; B60Q 3/225; B60Q 3/242; B60Q 3/252; B60Q 3/258; B60Q 3/267; B60Q 3/283
USPC ........................................................ 362/511
See application file for complete search history.

(56) References Cited

FOREIGN PATENT DOCUMENTS

| | | |
|---|---|---|
| DE | 10 2013 105 261 A1 | 11/2014 |
| DE | 10 2015 221 672 A1 | 5/2017 |
| EP | 1 072 383 A1 | 1/2001 |
| EP | 2 354 637 A2 | 8/2011 |
| JP | 2006-51901 A | 2/2006 |
| JP | 2008-166072 A | 7/2008 |
| JP | 2018-120683 A | 8/2018 |

OTHER PUBLICATIONS

DE102011000022B4 machine translation; 7 pages. (Year: 2011).*
International Search Report & Written Opinion issued Oct. 17, 2022 in PCT/EP2022/071607, filed on Aug. 2, 2022, 15 pages (with English Translation).

* cited by examiner

INTERIOR-LIGHTING DEVICE FOR A VEHICLE

The present invention relates to the field of lighting and/or light signaling, and more particularly the lighting of a motor vehicle passenger compartment.

Such interior lighting can be provided by lighting devices comprising light guides, which are parts inside which light rays move in a controlled manner, from an entry face near which a light source is positioned to an exit face from which the light rays emerge. Within the light guide, the propagation of the light rays is controlled in particular by internal reflections on different faces of the light guide.

Such lighting devices can take various geometric forms, thus meeting a variety of esthetic requirements. The light guides make it possible for example to light hard-to-reach areas of the passenger compartment of the vehicle.

A single lighting device can be used for a plurality of lighting functions, for example dynamic lighting, ambient lighting, or backlighting. To this end, the lighting device can comprise a plurality of light guides, for example one for each function, as well as a plurality of light sources and a plurality of members for controlling these light sources. The multiplication of the number of functions results however in an increase in components and more particularly in the number of light sources and control members, which leads to an increase in the costs relating to interior lighting and generally to excessive energy consumption for the motor vehicle.

One solution proposed by the invention to overcome these technical difficulties is the use of a lighting device in which a single printed circuit board is necessary for multi-function lighting, in this case with three different lighting functions. The light sources are then positioned on a single support and in the same plane, and a single light guide performs at least two lighting functions. It is thus possible to reduce the number of light sources and control members controlling these light sources, by using the same light sources for multiple functions, and thus to reduce the associated costs and energy consumption of the motor vehicle. In addition, the manufacturing of such a lighting device is simplified.

The main object of the present invention is thus an interior-lighting device for a motor vehicle, comprising a support on which are positioned a first row of light sources and a second row of light sources, the lighting device comprising a first light guide that comprises a light intake face, a transmission unit and a light discharge face, light rays emitted by the first row of light sources entering the first guide via the light intake face and being transmitted to the light discharge face of the first light guide, and a second light guide that comprises a light entry face, a transmission body, a first light exit face and a second light exit face, the light rays emitted by the second row of light sources entering the second light guide via the light entry face and being transmitted to these first and second light exit faces.

Such an interior-lighting device can perform different lighting functions, which in this case are three in number, with direct dynamic lighting, backlighting through a trim, and ambient lighting. Light rays emitted by the light sources propagate within the light guides, and leave the guides via zones dedicated to each of these lighting functions. The light rays involved in direct dynamic lighting thus exit the first light guide via the light discharge face, the light rays necessary for backlighting leave the second light guide via its first light exit face, and the light rays involved in ambient lighting use the second light exit face of this second light guide. It will thus be understood that the second light guide performs two different lighting functions, as it combines backlighting and ambient lighting. In addition, the first row of light sources and the second row of light sources are both positioned on the same support, and can thus be controlled by a reduced number of control members, thus reducing the costs associated with the use of a plurality of these control members.

According to one feature, the second light exit face is in a plane intersecting the light entry face of the second light guide. It will be understood that the light entry face and the second light exit face extend in intersecting planes. It will be understood that if the second light exit face has a curved surface, all of the planes in which the tangents to the curved surface of this second light exit face extend intersect the plane of the light entry face, whether such a curvature of the surface of the second light exit face is considered in a longitudinal direction or a vertical direction of the light guide.

According to one feature of the invention, the plane of the second light exit face is perpendicular to the light entry face of the second light guide. In the same way as above, if the second light exit face is inscribed in a curved surface, at least one plane tangent to this curved surface is perpendicular to the plane in which the light entry face is inscribed.

Such a positioning results from the presence of an elbow portion within the second light guide. According to another feature of the invention, the first light exit face and the second light exit face of the second light guide intersect each other. It will be understood here that the first light exit face is inscribed in a plane, such plane intersecting a plane in which the second light exit face is inscribed. If at least one of these two faces is inscribed in a curved surface rather than in a plane, at least one plane tangent to this curved surface is considered to intersect the plane in which the other face is inscribed.

According to another feature of the invention, the light discharge face and the second light exit face each form a line of light.

The light discharge face and the second light exit face each extend mainly in a longitudinal direction, and thus have a straight, elongate surface that corresponds to a line of light.

According to another feature, a surface area of the first light exit face is greater than the surface area of the line of light of the light discharge face and/or than the surface area of the line of light of the second light exit face.

It will thus be understood that the surface area of the first light exit face of the second light guide is larger than the surface area of the light discharge face of the first light guide taken in isolation, and/or larger than the surface area of the second light exit face of the second light guide taken in isolation, or even larger than the combined surface area of these two faces.

According to one feature of the invention, the first row of light sources and the second row of light sources are positioned on a single printed circuit board.

The first row of light sources and the second row of light sources are positioned on the same printed circuit board in two parallel rows. Such positioning, which only uses a single printed circuit board, makes it possible to reduce the costs linked in particular to the multiplication of the control members controlling these light sources. It will be understood that in order to be able to be involved in lighting for three different functions, some of these light sources are capable of performing a plurality of lighting functions.

According to one particular embodiment, the first light guide and the second light guide are connected by a bridge.

According to a first embodiment, the first light guide and the second light guide form two separate entities. Conversely, according to a second embodiment, the first light guide and the second light guide are connected by a bridge, which is integrally formed with these light guides so as to form a one-piece assembly.

According to one feature, the light guides are made from a material configured to convey the light rays by internal transmission.

It will thus be understood that the material from which the light guide is made is a transparent or translucent material. Such a material can in particular be plexiglass or polycarbonate.

According to one feature of the invention, the first light guide comprises at least one slit extending from the light intake face toward the light discharge face, so as to define two bars within the transmission body of the first light guide.

The first guide thus has a plurality of bars, which are laterally delimited by slits that extend from the light discharge face. Such slits are through-slits, that is, they pass through the first light guide from one side to the other, that is, from an upper wall to a lower wall.

According to another feature, the second light guide comprises a light entry portion and a light exit portion, the light entry portion comprising the light entry face, this light entry face being positioned opposite the second row of light sources, and the light exit portion comprising the first and second light exit faces, this light entry portion having at least one slot extending from the light entry face, a groove borne by the first light exit face extending in the continuation of this slot.

This second light guide therefore has a light entry portion via which light rays emitted by the second row of light sources enter the light guide, and a light exit portion via which they exit it, the light exit portion being positioned in the continuation of the light entry portion. More specifically, these light rays enter the light guide via the light entry face of the light entry portion, and leave it either via the first light exit face or via the second light exit face of the light exit portion. Within the light entry portion, at least one slot extends from the light entry face, and within the light exit portion, this slot is followed by a groove borne by the adjacent first light exit face.

The presence of slots and grooves creates air gaps within the surface of the second light guide, which prevents light ray leaks, so that they propagate over the entire exit portion, and more particularly on regions of the exit portion that are furthest from the entry portion. Such a configuration makes it possible to contain the light rays in a specific portion of the light guide, here a strip.

According to one feature, the grooves extend over at least one third of a thickness of the light exit portion, this thickness being measured between the first light exit face and a reflection face of the light exit portion opposite this first light exit face.

According to one feature of the invention, the second light guide comprises a series of strips, at least two adjacent strips being separated by a slot and a groove, the adjacent strips being joined by at most one third of the thickness of the light exit portion.

It will be understood that in the main direction of elongation of the second light guide, that is, along its longitudinal dimension, slots and grooves are positioned on the second light guide. These slots and grooves define strips, each strip being delimited by two adjacent slots in the light entry portion and by two adjacent grooves in the light exit portion.

The slots pass through the light entry portion from one side to the other, that is, from an upper face of the light entry portion to a lower face of the light entry portion. The grooves correspond to depressions in the light exit portion, these depressions corresponding to at least one third of the thickness of the light exit portion. In other words, the grooves have a depth corresponding to at least one third of the thickness of the light exit portion. This light exit portion is delimited by the light exit face at one end thereof, and by the reflection face at the other end thereof.

There is complementarity between the depth of the grooves and the thickness of the light exit portion that connects two strips of the light guide. Such a thickness of the light exit portion that connects two strips can for example be three millimeters.

The invention also relates to an interior panel of a motor vehicle comprising a lighting device as described above.

According to one feature of the invention, this panel is positioned on an interior face of a door of the motor vehicle.

Alternatively, this panel can be positioned on a dashboard of the motor vehicle.

According to another feature, this panel comprises a trim covering the first exit face of the second light guide, the turning on of at least one of the light sources making a pattern of this trim visible.

The lighting device is thus positioned between the interior face of the door, and the trim. The first exit face of the second light guide, which is the face via which the light rays exit therefrom, is covered by the trim. The turning on of at least one light source emits light rays which, when they pass through the first exit face, make the pattern visible through the trim.

Figure 2:
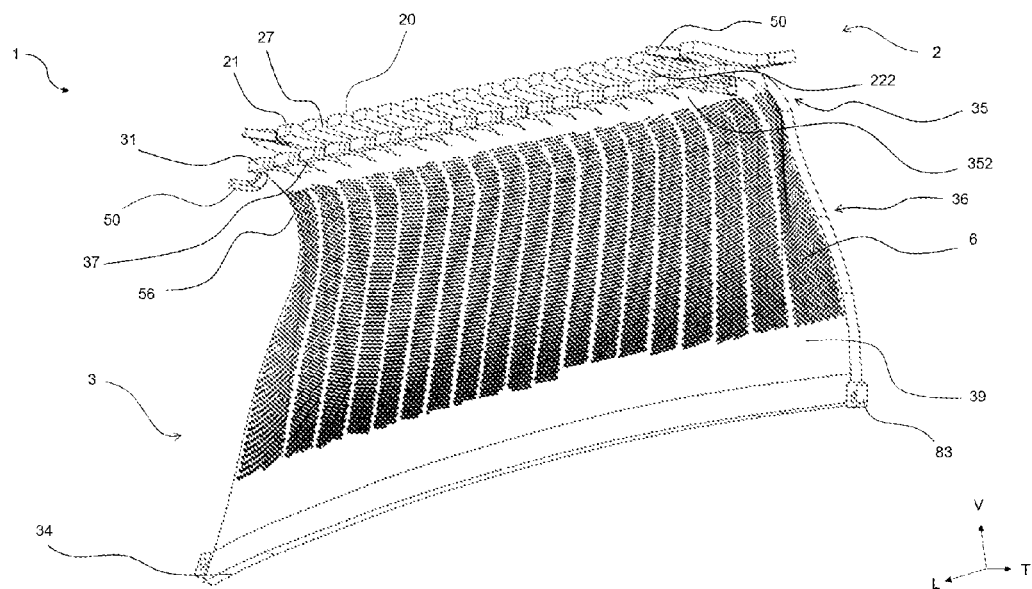
Figure 3:
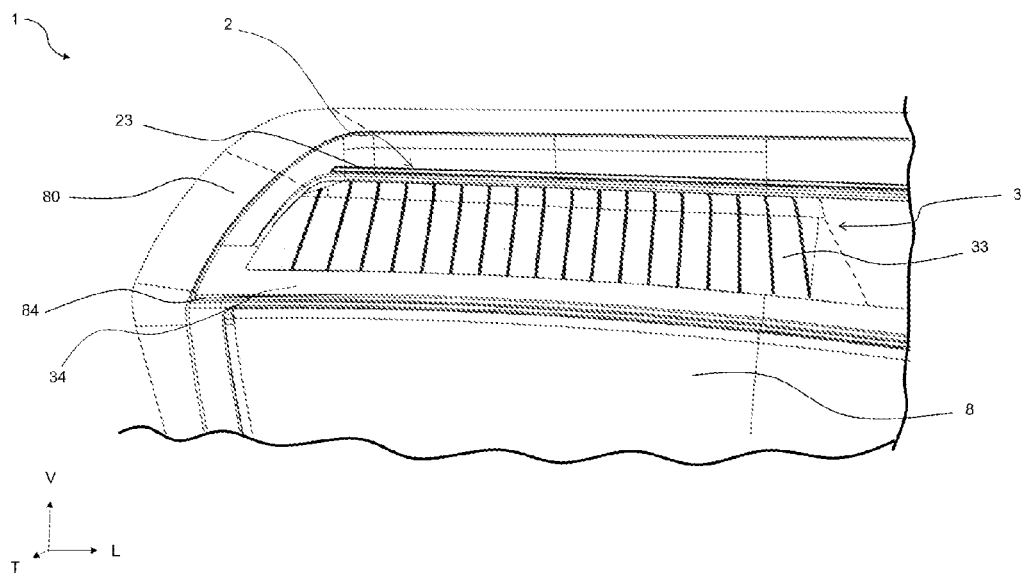
Figure 4:
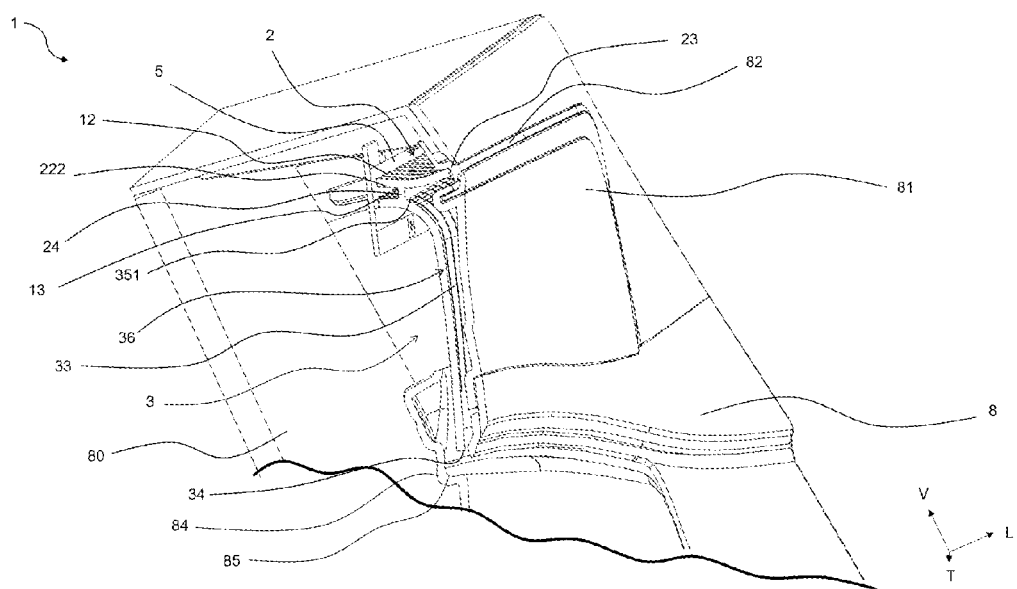

Further features, details and advantages of the invention will become more clearly apparent from reading the following description, and from studying exemplary embodiments given by way of non-limiting illustration, with reference to the appended drawings, in which:

FIG. 1 is a perspective view of a lighting device according to a first embodiment of the invention;

FIG. 2 schematically illustrates a rear view of part of the lighting device in FIG. 1;

FIG. 3 schematically illustrates a front view of an interior panel of a motor vehicle comprising the lighting device in FIG. 1;

FIG. 4 is a cross-sectional view of the lighting device in FIG. 1 according to a second embodiment.

The features, variants and different embodiments of the invention may be combined with one another, in various combinations, provided that they are not mutually incompatible or mutually exclusive.

In particular, it is possible to envisage variants of the invention that comprise only a selection of features described below, independently of the other features described, if this selection of features is sufficient to confer a technical advantage and/or to differentiate the invention from the prior art.

In the figures, elements common to several figures have the same reference sign.

In the following detailed description, the terms "longitudinal", "transverse" and "vertical" refer to the orientation of a lighting device according to the invention. A longitudinal direction corresponds to a main direction of elongation of this lighting device, this longitudinal direction being parallel to a longitudinal axis L of a coordinate system L, V, T illustrated in the figures. A vertical direction corresponds to a direction in which the first row of light sources and the second row of light sources are superposed, this vertical direction being parallel to a vertical axis V of the coordinate system L, V, T, and this vertical axis V being perpendicular to the longitudinal axis L. Finally, a transverse direction corresponds to a direction parallel to a transverse axis T of the coordinate system L, V, T, this transverse axis T being perpendicular to the longitudinal axis L and to the vertical axis V.

FIGS. 1 and 2 are perspective views of a lighting device 1 for the interior of a motor vehicle, in a front view in FIG. 1 and a rear view in FIG. 2. FIG. 2 shows just part of the lighting device 1, some of its elements having been removed to facilitate understanding of the invention.

The lighting device 1 comprises two light guides, with a first light guide 2 and a second light guide 3. These light guides 2 and 3 are made from a material configured to convey the light rays by internal transmission to these light guides 2 and 3. Such a material, which is transparent or translucent, can for example be plexiglass or polycarbonate.

The light guides 2 and 3 are positioned in the vicinity of a support 4, which is a part that extends mainly in longitudinal and vertical directions. This support 4 comprises a printed circuit board 5 on which are positioned light sources, and more specifically a first row of light sources 12 and a second row of light sources 13. The light sources of the first row of light sources 12 and the second row of light sources 13 are positioned at regular intervals on the support 4 and more specifically on the printed circuit board 5. The first row of light sources 12 and the second row of light sources 13 are aligned and form two parallel rows on this printed circuit board 5. The light sources each comprise RGB light-emitting diodes, such diodes making it possible to emit red, green or blue light rays.

The first row of light sources 12 is opposite the first light guide 2, and more particularly a light intake face 21 of this first light guide 2, while the second row of light sources 13 is opposite the second light guide 3, and more particularly a light entry face 31 of this second light guide 3. It will thus be understood that this light intake face 21 and this light entry face 31 are the faces of the light guides 2 and 3 via which light rays emitted by the light sources enter these light guides 2 and 3. The light rays then propagate within the first light guide 2 and the second light guide 3, within a transmission unit 22 and a transmission body 32 respectively. These light rays leave the light guides 2 and 3 via a light discharge face 23 in the case of the first light guide 2 and via a first light exit face 33 or a second light exit face 34 in the case of the second light guide 3.

The first light guide 2, which is rectangular, extends substantially in longitudinal and transverse directions. It comprises the light intake face 21 at a first of its transverse ends in the vicinity of the printed circuit board 5 and the first row of light sources 12, and the light discharge face 23 at a second of its transverse ends, opposite the first transverse end. The light intake face 21 and light discharge face 23 define in a transverse direction the transmission unit 22, within which the light rays emitted by the first row of light sources 12 propagate. This transmission unit 22 has, at the second transverse end of the first light guide 2 positioned opposite the printed circuit board 5, a slightly curved portion that extends at a distance from the second light guide 3.

The transmission unit 22 of the first light guide 1 is made up of bars 20, which are delimited by slits 27. Such slits 27 extend from the light intake face 21 toward the light discharge face 23. These slits 27 correspond to openings in a thickness of the transmission unit 22, which are in the form of points facing toward the light discharge face 23. The slits 27 are through-slits; the pass through the first light guide 2 from an upper wall 221 to a lower wall 222, this lower wall being opposite the second light guide 3. The upper wall 221 and the lower wall 222 are joined via the light intake face 21 at the first transverse end in the vicinity of the support 4, and via the light discharge face 23 at the second transverse end. The slits 27 do not however extend to this second transverse end.

The second light guide 3 mainly extends in longitudinal and vertical directions and, viewed from the front or the rear, is substantially trapezoid.

The second light guide 3 comprises a light entry portion 35 and a light exit portion 36, this light exit portion 36 being in the continuation of the light entry portion 35. The light entry portion 35 and the light exit portion 36 are connected by an elbow portion 56 and are therefore positioned in intersecting planes. The elbow portion 56 can form a right angle, and these intersecting planes are then perpendicular. The light entry portion 35 mainly extends in a longitudinal/transverse plane, while the light exit portion 36 mainly extends in a longitudinal/vertical plane. Of course, the invention covers the situation in which the light entry portion 35 extends longitudinally while being inscribed in a curve around the longitudinal direction L. Alternatively or additionally, the light entry portion 35 extends longitudinally while being inscribed in a curve around the transverse direction T.

The invention covers the situation in which the light exit portion 36 extends longitudinally while being inscribed in a curve around the longitudinal direction L. Alternatively or additionally, the light exit portion 36 extends longitudinally while being inscribed in a curve around the vertical direction V.

The light entry portion 35 comprises a light entry face 31, which is the face of the transmission body 32 via which the light rays enter this second light guide 3. The light exit portion 36 comprises two light exit faces 33 and 34 via which the light rays leave the second light guide 3, with a first light exit face 33 and a second light exit face 34.

Due to the elbow portion 56, the light entry face 31 and the first light exit face 33 are substantially parallel, while the light entry face 31 and the second light exit face 34 are positioned in intersecting planes, and here are substantially perpendicular.

If the first light exit face 33 is inscribed in a curved surface, at least one plane tangent to this curved surface is parallel to the plane in which the light entry face 31 is inscribed. Likewise, if the second light exit face 34 is inscribed in a curved surface, at least one plane tangent to this curved surface intersects the plane in which the light entry face 31 is inscribed, or at least one tangent plane is perpendicular thereto.

The light entry portion 35 of the second light guide 3 has at least one slot 37, and a groove 38 extends in the continuation of this slot 37. Such a groove 38 extends on the light entry portion 35, on the elbow portion 56, and on the light exit portion 36. In the embodiment illustrated in the figures, the second light guide 3 has a plurality of slots 37 and a plurality of grooves 38 in the continuation thereof. It will be understood here that the grooves 38 extend along a first straight line, the slots 37 extend along a second straight line, and these straight lines are coincident. The slots 37 are substantially triangular, the bases of these triangles being positioned in the vicinity of the light entry face 31 while the apexes of the triangles are facing toward the first light exit face 33. Alternatively, the second light guide 3 could have slots 37 in the form of parabolic cavities. The grooves 38 extend from the apexes of these triangles formed by the slots 37. The grooves 38 do not extend from one end to the other of the second light guide 3; they originate at one of their ends at the apex of the triangles formed by the slots 37, that is, at a distance from the light entry face 31, and at the other of their ends there is a zone without grooves 38 within the light exit portion 36. This zone without grooves 38 extends between the first light exit face 33, which comprises the grooves 38, and the second light exit face 34, the latter consisting of the rim of the second light guide 3 and which therefore intersects the first light exit face 33.

The second light guide 3 is made up of a series of strips 30 that are aligned in the transmission body 32 in the longitudinal direction. Each strip 30 is delimited by the light entry face 31 and the first light exit face 33. Laterally, these strips 30 are delimited by two adjacent slots 37 in the light entry portion 35, and by two adjacent grooves 38 in the light exit portion 36, the grooves 38 forming continuations of the slots 37.

The slots 37 are through-slots in that they pass through the light entry portion 35 from one side to the other, that is, from an upper face 351 of the light entry portion 35 to a lower face 352 of the light entry portion 35, these upper 351 and lower 352 faces being joined by the light entry face 31. Conversely, the grooves 38 are blind in that they do not pass through the light exit portion 36 from one side to the other. According to the invention, these grooves 38 extend over at least one third of a thickness E of the light exit portion 36, this thickness E being measured between the first light exit face 33 and a reflection face 39 of the light exit portion 36. Such a reflection face 39 is opposite the first light exit face 33 and substantially perpendicular to the second light exit face 34.

Within the second light guide 3, the first light exit face 33 of the light exit portion 36 is thus in the continuation of the upper face 351 of the light entry portion 35, while the reflection face 39 of the light exit portion 36 is in the continuation of the lower face 352 of the light entry portion 35. The elbow portion 56 defines both the transition from the upper face 351 to the first light exit face 33 and the transition from the lower face 352 to the reflection face 39.

Two adjacent strips 30 of the second light guide 3 are joined to each other by at most one third of the thickness E of the light exit portion 36. It will thus be understood that this section of the light exit portion 36 that connects the strips 30 complements the grooves 38 that contribute to the definition thereof.

The presence of slits 27 in the first light guide 2 and of slots 37 and grooves 38 in the second light guide 3 makes it possible to create, within the transmission unit 22 or the transmission body 32 respectively, air gaps that channel the light rays in order to propagate them on the entire light discharge face 23 in the case of the light guide 2 or the entire light exit portion 36 in the case of the second light guide 3. Such a configuration facilitates the lighting of zones far away from the light intake face 21 or from the light entry face 31, as is the case in particular of the second light exit face 34 of the second light guide 3, by limiting undesirable propagation of the light rays in a longitudinal direction.

In addition, the second light guide 3 has a decoupling structure 6, which can particularly be seen in FIG. 2. This decoupling structure 6, which here is made up of a set of prisms, is positioned on the reflection face 39. The decoupling structure 6 is a device that makes it possible to change the angle of incidence of the light rays that propagate in the second light guide 3. When these light rays strike the decoupling structure 6, they are deflected so that they can be redirected toward the first light exit face 33 and the second light exit face 34.

In addition, the second light guide 3 has, on the upper face 351 of the light entry portion 35, mixing means 7. These mixing means 7 are configured to mix the light rays emitted by the second row of light sources 13 and entering via the light entry face 31. These light sources emit colored light rays due to their RGB light-emitting diodes, but it is however possible to light the second light guide 3 with white light. However, such an operation requires a certain propagation distance of the light rays, this distance being necessary for the mixing of the colors. The mixing means 7 are thus a contrivance that makes it possible to reduce the distance necessary for the mixing of the colors, therefore making it possible to obtain white lighting despite a reduced propagation distance of the light rays.

The first light guide 2 and the second light guide 3 further comprise pins 50 for centering the printed circuit board 5, such centering pins 50 protruding either from the transmission unit 22 in the case of the first light guide 2 or from the lower face 352 of the light entry portion 31 in the case of the second light guide 3. The centering pins 50 have different shapes depending on whether they are attached to the first light guide 2 or to the second light guide 3. The two centering pins 50 of the first light guide 2 are thus straight rods extending between two bars 20 in the transverse direction, while the two centering pins 50 of the second light guide 3 are rods bent at a right angle, extending in a vertical direction in the case of a first part of the rods and in a transverse direction in the case of a second part of the rods. These centering pins 50, which can particularly be seen in FIG. 2, ensure the correct positioning of the printed circuit board 5 relative to the light guides 2 and 3. To this end, the centering pins 50 are inserted into corresponding orifices passing through the printed circuit board 5 from one side to the other.

FIGS. 3 and 4 illustrate an interior panel 8 of a motor vehicle comprising the lighting device according to the invention, in a front view in FIG. 3 and in a cross-sectional side view in FIG. 4. This interior panel 8 is shown here as being positioned on an interior face 80 of a door of the motor vehicle, this face being opposite a passenger compartment of this vehicle, but it could also be a panel of a dashboard of the motor vehicle.

The embodiment shown in FIG. 4 differs from the embodiment previously illustrated in that here, the lighting device 1 comprises a bridge 24. This bridge 24 connects the first light guide 2 and the second light guide 3; more specifically, it connects the lower wall 222 of the first light guide 2 to the upper face 351 of the second light guide 3. The bridge 24 is a structural joint that is integrally formed with the two light guides 2 and 3 so as to form a one-piece assembly. It will be understood that the features described with reference to the first embodiment also apply to this embodiment in which the lighting device 1 comprises the bridge 24.

The second light guide 3 comprises means 83 for fastening to the panel 8, which can particularly be seen in FIGS. 1 and 2 and consist of continuations of the transmission body 32 in the vicinity of the second light exit face 34. These fastening means 83 extend from the second light guide 3 in the longitudinal direction. The fastening means 83, for example fastening tabs provided with eyelets, facilitate the securing of this second light guide 3 to the motor vehicle on which it is to be provided, and more particularly to the panel 8.

According to the invention, the light discharge face 23 of the first light guide 2 and the second light exit face 34 each form a line of light. It will be understood that due to the shape of these faces, which are both substantially elongate, the light rays emitted respectively by the first row of light sources 12 and the second row of light sources 13 form, on exit from the first light guide 2 and the second light guide 3, a line of light. Conversely, the first light exit face 33 of the second light guide 3 being substantially rectangular, the light rays that leave this second light guide 3 via this first light exit face 33 do not form a line of light.

The first light exit face 33 thus has a large surface area, and can for example have a dimension measured in the transverse direction of between 20 and 50 mm, while the light entry portion 2 can have a dimension measured in the longitudinal direction of between 30 and 500 mm. The surface area of the first light exit face 33 is greater than the surface area of the line of light formed on the light discharge face 23 of the first light guide 2, and/or than the surface area of the line of light formed on the second light exit face 34 of the second light guide 3.

The lighting device 1 according to the invention is designed to perform a plurality of lighting functions, with in particular direct dynamic lighting, backlighting through a trim, and ambient lighting. These three functions are therefore spread between the two light guides 2 and 3, the first light guide 2 providing direct dynamic lighting while the second light guide 3 combines the backlighting and ambient lighting functions. More specifically, direct dynamic lighting is provided by the light rays exiting via the light discharge face 23 of the first light guide 2, backlighting by the light rays exiting via the first light exit face 33 of the second light guide 3, and ambient lighting by the light rays exiting via the second light exit face 34 of this second light guide 3.

The backlighting function takes place through a trim 81 of the panel 8, this trim 81 being positioned so that it covers the first light exit face 33 of the second light guide 3. The trim 81 is suitable for being passed through by light rays and comprises at least one pattern. When the second row of light sources 13 emits light rays, these light rays thus propagate within the transmission body 32 and then leave the second light guide 3 via its first light exit face 33. The light rays then pass through the trim 81, thus making the pattern that it bears visible.

The direct dynamic lighting function is obtained by means of the light rays that use the light discharge face 23, the light rays passing through an insert 82 similar to the trim 81. This light discharge face 23 being opposite the panel 8, the light rays reach the passenger compartment of the motor vehicle without being deflected on exit from the first light guide 2, which allows direct lighting.

With regard to the ambient lighting function, the light rays dedicated to such lighting leave the second light guide 3 via its second light exit face 34, which is not oriented toward the passenger compartment of the vehicle. This second light exit face 34 is opposite a recess 84 of the panel 8, one wall 85 of which extends in a plane perpendicular to the planes in which the trim 81 and the insert 82 extend. The light rays coming from the second light exit face 34 thus reverberate on this wall 85 on exit from the second light guide 3, and are thus deflected before lighting the passenger compartment of the motor vehicle. Such a configuration makes it possible to obtain, in contrast to the direct lighting emanating from the first light guide 2, more diffuse ambient lighting.

The present invention thus proposes an interior-lighting device for a motor vehicle comprising light sources positioned on a single printed circuit board, this lighting device being capable of performing three different lighting functions by means of a first light guide and a second light guide. Such a lighting device contributes to reducing the number of components necessary for lighting the passenger compartment of the vehicle, thereby reducing the operating costs of the interior lighting and the energy consumption of the vehicle linked to this use.

The present invention is not however limited to the means and configurations described and illustrated herein, and it also extends to all equivalent means and configurations and to any technically effective combination of such means.

The invention claimed is:

1. An interior-lighting device for a motor vehicle, comprising a support on which are positioned a first row of light sources and a second row of light sources, the lighting device comprising a first light guide that comprises a light intake face, a transmission unit and a light discharge face, light rays emitted by the first row of light sources entering the first light guide via the light intake face and being transmitted to the light discharge face of the first light guide, and a second light guide that comprises a light entry face, a transmission body, a first light exit face and a second light exit face, the light rays emitted by the second row of light sources entering the second light guide via the light entry face and being transmitted to these first and second light exit faces, wherein the second light exit face is in a plane intersecting the light entry face of the second light guide.

2. The lighting device as claimed in claim 1, wherein the light discharge face and the second light exit face each form a line of light.

3. The lighting device as claimed in claim 1, wherein a surface area of the first light exit face is greater than the surface area of the line of light of the light discharge face and/or than the surface area of the line of light of the second light exit face.

4. The lighting device as claimed in claim 1, wherein the first row of light sources and the second row of light sources are positioned on a single printed circuit board.

5. The lighting device as claimed in claim 1, wherein the first light guide and the second light guide are connected by a bridge.

6. The lighting device as claimed in claim 1, the light guides being made from a material configured to convey the light rays by internal transmission.

7. The lighting device as claimed in claim 1, wherein the first light guide comprises at least one slit extending from the light intake face toward the light discharge face, so as to define two bars within the transmission body of the first light guide.

8. The lighting device as claimed in claim 1, wherein the second light guide comprises a light entry portion and a light exit portion, the light entry portion comprising the light entry face, this light entry face being positioned opposite the second row of light sources, and the light exit portion comprising the first and second light exit faces, this light entry portion having at least one slot extending from the light entry face, a groove borne by the first light exit face extending in the continuation of this slot.

9. The lighting device as claimed in claim 1, wherein the grooves extend over at least one third of a thickness of the light exit portion, this thickness being measured between the first light exit face and a reflection face of the light exit portion opposite this first light exit face.

10. The lighting device as claimed in claim 1, wherein the second light guide comprises a series of strips, at least two adjacent strips being separated by a slot and a groove, the adjacent strips being joined by at most one third of the thickness of the light exit portion.

11. An interior panel of a motor vehicle comprising an interior-lighting device for a motor vehicle. comprising a support on which are positioned a first row of light sources and a second row of light sources, the lighting device comprising:
- a first light guide that comprises a light intake face, a transmission unit and a light discharge face, light rays emitted by the first row of light sources entering the first light guide via the light intake face and being transmitted to the light discharge face of the first light guide, and
- a second light guide that comprises a light entry face a transmission body, a first light exit face and a second light exit face, the light rays emitted by the second row of light sources entering the second light guide via the light entry face and being transmitted to these first and second light exit faces wherein the panel is positioned on an interior face of a door of the motor vehicle and comprises a trim covering the first exit face of the second light guide, the turning on of at least one of the light sources making a pattern of this trim visible.

12. An interior-lighting device for a motor vehicle, comprising a support on which are positioned a first row of light sources and a second row of light sources, the lighting device comprising a first light guide that comprises a light intake face, a transmission unit and a light discharge face, light rays emitted by the first row of light sources entering the first light guide via the light intake face and being transmitted to the light discharge face of the first light guide, and a second light guide that comprises a light entry face, a transmission body, a first light exit face and a second light exit face, the light rays emitted by the second row of light sources entering the second light guide via the light entry face and being transmitted to these first and second light exit faces, wherein the first light exit face and the second light exit face of the second light guide intersect each other.

13. The lighting device as claimed in claim 12, wherein the first light exit face and the second light exit face of the second light guide intersect each other.

14. The lighting device as claimed in claim 12, wherein the light discharge face and the second light exit face each form a line of light.

15. The lighting device as claimed in claim 12, wherein a surface area of the first light exit face is greater than the surface area of the line of light of the light discharge face and/or than the surface area of the line of light of the second light exit face.

16. The lighting device as claimed in claim 12, wherein the first row of light sources and the second row of light sources are positioned on a single printed circuit board.

17. The lighting device as claimed in claim 12, wherein the first light guide and the second light guide are connected by a bridge.

18. The lighting device as claimed in claim 12, wherein the first light guide comprises at least one slit extending from the light intake face toward the light discharge face, so as to define two bars within the transmission body of the first light guide.

19. The lighting device as claimed in claim 12, wherein the second light guide comprises a light entry portion and a light exit portion, the light entry portion comprising the light entry face, this light entry face being positioned opposite the second row of light sources, and the light exit portion comprising the first and second light exit faces, this light entry portion having at least one slot extending from the light entry face, a groove borne by the first light exit face extending in the continuation of this slot.

20. The lighting device as claimed in claim 12, wherein the grooves extend over at least one third of a thickness of the light exit portion, this thickness being measured between the first light exit face and a reflection face of the light exit portion opposite this first light exit face.

* * * * *